(12) United States Patent
Gianone

(10) Patent No.: US 8,182,385 B2
(45) Date of Patent: May 22, 2012

(54) ELECTROMECHANICAL DIFFERENTIAL LOCK ASSEMBLY

(75) Inventor: Roberto Gianone, Barengo (IT)

(73) Assignee: ArvinMeritor Technology, LLC, Troy, MI (US)

(*) Notice: Subject to any disclaimer, the term of this patent is extended or adjusted under 35 U.S.C. 154(b) by 972 days.

(21) Appl. No.: 12/161,810

(22) PCT Filed: Mar. 21, 2006

(86) PCT No.: PCT/IT2006/000175
§ 371 (c)(1),
(2), (4) Date: Jul. 23, 2008

(87) PCT Pub. No.: WO2007/108022
PCT Pub. Date: Sep. 27, 2007

(65) Prior Publication Data
US 2009/0176613 A1    Jul. 9, 2009

(51) Int. Cl.
*F16H 48/34* (2012.01)
*F16H 57/02* (2012.01)
(52) U.S. Cl. ..................... 475/150; 74/606 R
(58) Field of Classification Search ............ 475/150
See application file for complete search history.

(56) References Cited

U.S. PATENT DOCUMENTS

| | | | |
|---|---|---|---|
| 5,030,181 A | 7/1991 | Keller | |
| 6,283,884 B1 | 9/2001 | El-Kassouf | |
| 6,508,734 B2 | 1/2003 | El-Kassouf | |
| 6,533,692 B1 | 3/2003 | Bowen | |
| 7,264,568 B2* | 9/2007 | Ludwig et al. | 475/233 |
| 7,325,664 B2* | 2/2008 | Fusegi | 192/84.92 |
| 2005/0245342 A1 | 11/2005 | Pontanari et al. | |
| 2006/0247087 A1 | 11/2006 | Pontanari et al. | |

FOREIGN PATENT DOCUMENTS

| | | |
|---|---|---|
| DE | 3839787 A1 | 6/1989 |
| EP | 1518741 A2 | 3/2005 |
| WO | 2004/068002 A1 | 8/2004 |

OTHER PUBLICATIONS

International Preliminary Report on Patentability dated Oct. 2, 2008.
Search Report and Written Opinion PCT/IT2006/00175.

* cited by examiner

*Primary Examiner* — Edwin A Young
(74) *Attorney, Agent, or Firm* — Carlson, Gaskey & Olds, PC

(57) ABSTRACT

A differential lock assembly includes a shift collar (36) that is moved in response to an electronic input signal between locked and unlocked positions. A coil housing (40) is supported on the shift collar and includes a recess (42) that receives a coil. A drag plate (60) is connected to the shift collar and coil housing to enclose the coil within the recess. When the coil is energized, the shift collar (36) is moved to the locked position. A resilient member (74) returns the shift collar (36) to the unlocked position when the coil is not energized. The shift collar (36), coil housing (40), drag plate (60), and resilient member (74) are pre-assembled together to form an assembled unit, which is installed within an axle differential as an adjusting nut to apply preload to an associated differential bearing.

26 Claims, 3 Drawing Sheets

ELECTROMECHANICAL DIFFERENTIAL LOCK ASSEMBLY

TECHNICAL FIELD

This invention relates to a differential assembly that utilizes an electronic coil and shift collar assembly to actuate a differential lock.

BACKGROUND OF THE INVENTION

Vehicle drive axles typically include a pair of axle shafts for driving vehicle wheels. A drive axle uses a differential to control input speed and torque to the axle shafts. Under ideal conditions, when the vehicle is driven along a straight path, the wheels will be turning at approximately the same speed and the torque will be equally split between both wheels. When the vehicle negotiates a turn, the outer wheel must travel over a greater distance than the inner wheel. The differential allows the inner wheel to turn at a slower speed than the outer wheel as the vehicle turns.

Often the differential includes a differential locking mechanism. When there are poor road conditions, i.e., slippery or rough surfaced roads, the differential locking mechanism allows maximum wheel and tire traction for improved control. If the differential does not have a differential locking mechanism and one tire is on ice, all of the torque and speed will be transferred to the wheel on ice. Thus, the tire just spins on the ice and the vehicle is prohibited from traveling forward. A differential locking mechanism allows the axle shafts to rotate at the same speed while transferring all available torque to the tire not on the ice.

One type of differential locking mechanism is comprised of an air actuated shift collar that locks a differential housing to the axle shafts. An example of one type of air actuated shift collar is disclosed in WO 2004/068002, which is assigned to the assignee of the present invention. Some disadvantages with an air actuation method are the significant number of components that are required, the possibility of leakage, and increased component wear. The significant number of components that are required to operate this system increase assembly time and overall system cost.

Another type of differential locking mechanism, also disclosed in WO 2004/068002, utilizes an electronically actuated shift collar. An electronic actuator generates an electronic signal to move a shift collar from an unlocked position to a locked position. The electronic actuator comprises a coil that surrounds a portion of the shift collar. The coil is selectively energized to move the shift collar to engage a differential case, which locks the differential. A spring disengages the shift collar from the differential case and moves the shift collar back to the unlocked position when the coil is not energized.

While this type of system is more efficient and cost effective than an air actuation system, there are some disadvantages. For example, in order to ensure a smooth engagement, the coil must be positioned on the shift collar and aligned with the differential case and the axle shaft, which can be difficult during assembly. Thus, there is a need for an electronically actuated locking mechanism that can be more easily assembled onto a differential.

SUMMARY OF THE INVENTION

A differential lock assembly includes a shift collar that is moved in response to an electronic input signal between locked and unlocked positions. In the unlocked position, speed differentiation between a pair of axle shafts is permitted. In the locked position the shift collar engages a differential case to lock the pair of axle shafts for rotation together. A coil housing is supported on the shift collar and includes a recess that receives a coil. The recess in the coil housing allows the coil to be easily and consistently aligned with a differential case and axle shaft. This provides smooth and efficient engagements between the shift collar and differential case.

In one example, a drag plate is connected to the shift collar and coil housing to enclose the coil within the recess. Drag anchors are supported on the shift collar and fasteners are used to pull the drag plate toward the shift collar. Slide members are fixed to an end face of the coil housing. The drag plate is supported on the slide members for sliding movement as the fasteners secure the drag plate to the shift collar.

In one example, the coil housing includes at least one bore that receives a resilient return mechanism. When the coil is energized by a power source, the shift collar is moved to the locked position. The resilient return mechanism returns the shift collar to the unlocked position when the coil is not energized. The resilient return mechanism includes a resilient member that reacts between the coil housing and the drag plate.

In one example, the coil housing includes a threaded attachment interface that is secured to a differential bearing cap. The shift collar, coil housing, drag plate, and resilient member are pre-assembled together to form an assembled unit, which is installed within an axle differential to apply preload to an associated differential bearing.

The subject invention provides a simple and effective method and apparatus for installing an electronic differential lock assembly into an axle differential in a way that provides consistent alignment between the coil and the differential case and axle shafts for smooth engagements. These and other features of the present invention can be best understood from the following specification and drawings, the following of which is a brief description.

DETAILED DESCRIPTION OF THE PREFERRED EMBODIMENT

Figure 1:
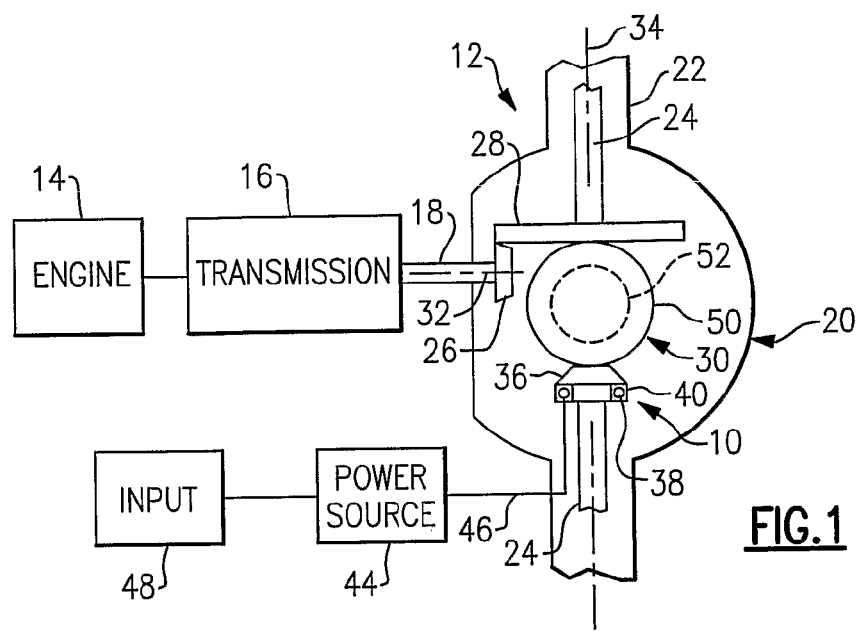
FIG. 1 is a schematic view of a drive axle assembly incorporating the subject invention.

A differential locking mechanism, shown generally at 10 in FIG. 1, is utilized in a drive axle 12. An engine 14, transmission 16, and drive shaft 18 cooperate to provide driving input into the drive axle 12. The drive axle 12 includes a carrier 20 supported within an axle housing 22. The axle housing 22 includes housing portions that substantially enclose the axle shafts 24 that are used to drive laterally spaced wheels (not shown) as known.

The carrier 20 includes a pinion gear 26, operably coupled to the drive shaft 18, and which is in driving engagement with a ring gear 28. The ring gear 28 drives a differential 30, which in turn drives the axle shafts 24. The pinion gear 26 defines a longitudinal axis 32 and the axle shafts 24 define a lateral axis 34 that is transverse to the longitudinal axis 32. The differential 30, as described to this point, is a known mechanism and includes similar components and operates in a similar manner to that described in WO 2004/068002, assigned to the assignee of the present invention, and which is hereby incorporated by reference.

Figure 2:
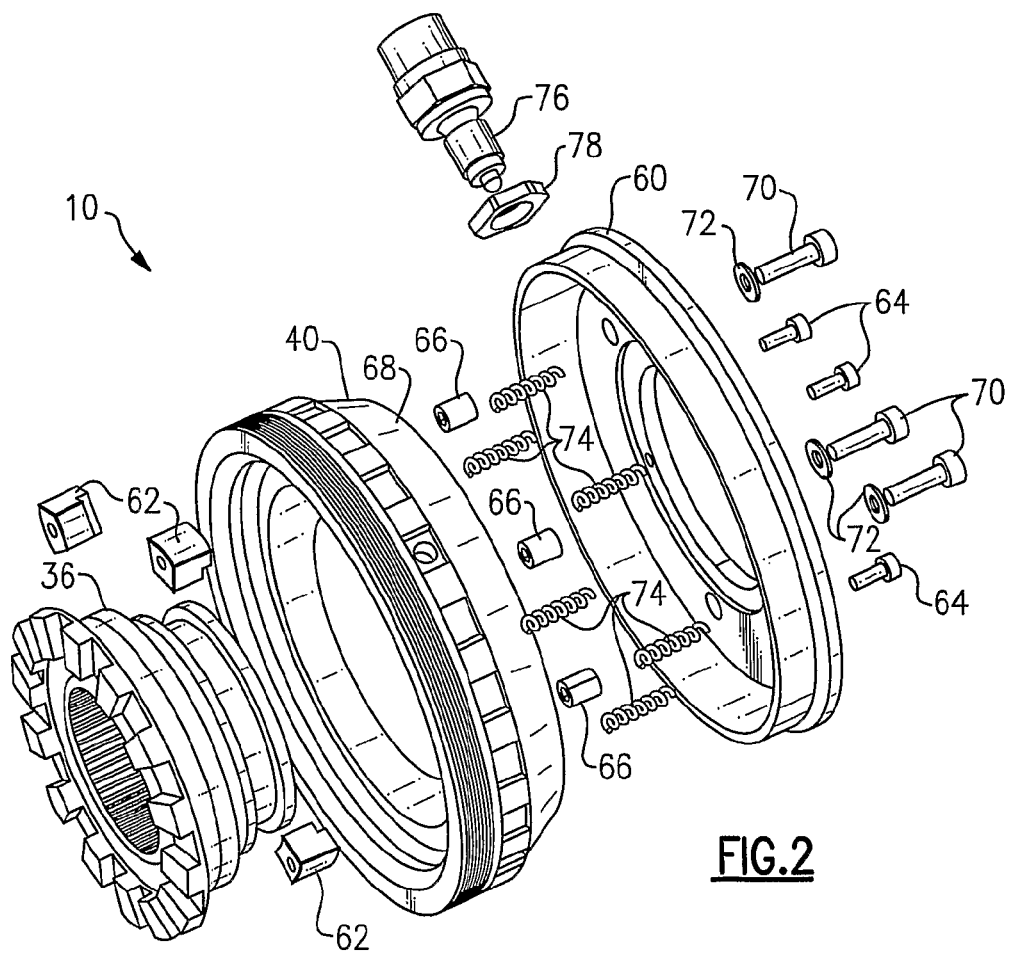
FIG. 2 is an exploded view of an actuating mechanism for a differential lock incorporating the subject invention.
Figure 3:
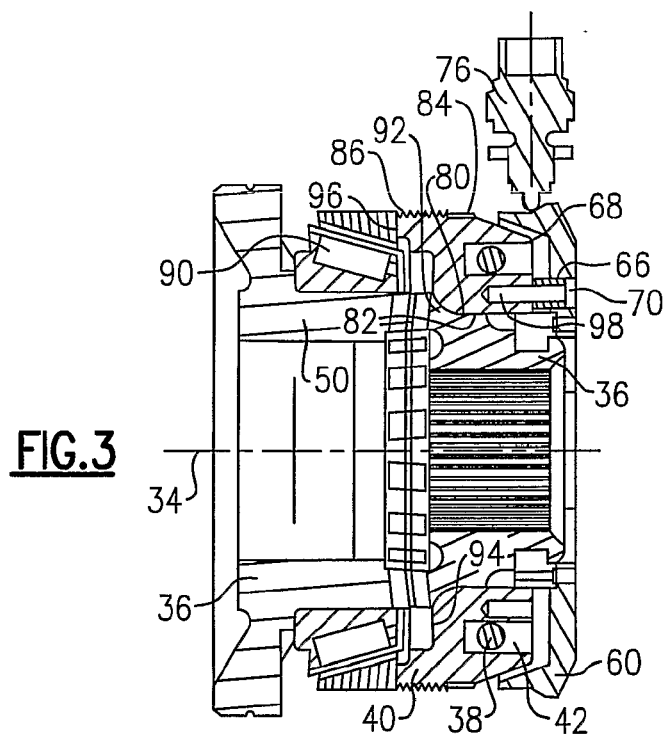
FIG. 3 is an assembled view, shown in cross-section, of the actuating mechanism shown in FIG. 2.

As shown in FIG. 2, the differential locking mechanism 10 includes a shift collar 36 that is electronically actuated via a coil 38 (FIG. 1). A coil housing 40 is supported by the shift collar 36. The coil housing 40 includes a recess 42 that receives the coil 38 (FIG. 3). The coil 38 is comprised of a coiled wire that extends circumferentially around the shift collar 36. As shown in FIG. 1, the coil 38 is connected to a power source 44, such as a battery for example, that selectively energizes the coil 38 via an electronic signal 46. When the coil 38 is energized via an input command 48 from a driver or other input source, the shift collar 36 acts as an electromagnet and is moved from an unlocked position to a locked position. The operation of electromagnets is well known in the art and will not be discussed in detail.

The differential 30 includes a differential case 50 that supports a differential gear assembly 52, shown schematically in FIG. 1. The shift collar 36 is coupled to one of the axle shafts 24 in a manner similar to that described in WO 2004/068002. In response to a lock request, the coil 38 is energized and the shift collar 36 moves into engagement with the differential case 50. When in the unlocked position, the coil 38 is not powered and the shift collar 36 is disengaged from the differential case 50 allowing the differential to operate in a normal manner.

As described in WO 2004/068002, the axle shaft 24 includes an inboard set of splines (not shown), closest to the differential 30, and an outboard set of splines (not shown). The inboard set of splines is engaged with a differential side gear in the differential gear assembly 52, while the outboard set of splines cooperates with the shift collar 36. When the input command 48 is issued, the power source 44 is energized, which causes the shift collar 36 to move towards the differential 30. This allows the shift collar 36 to engage with the differential case 50, while still remaining engaged with the outboard set of splines to achieve a locked position. Power transfer through the differential 30 is now achieved through the locked differential case 50, differential gear assembly 52, and both axle shafts 24 locked together, rather than through the differential gear assembly 52 alone.

An exploded view of the differential locking mechanism 10 is shown in FIG. 2. The differential locking mechanism 10 includes the shift collar 36, the coil housing 40, and a drag plate 60. The coil housing 40 includes the recess 42 that receives the coil 38 (FIG. 3). The drag plate 60 is connected to the shift collar 36 and coil housing 40 to enclose the coil 38 within the differential locking mechanism 10. This allows the coil 38 be consistently and easily aligned with the differential case 50 and axle shaft 24 to provide smooth engagements.

Drag anchors 62 cooperate with fasteners 64 to pull the drag plate 60 along slide members 66 to secure the drag plate 60 to the shift collar 36 and coil housing 40. The slide members 66 comprise cylinders that are fixed to an end face 68 of the coil housing 40 with screws 70 and washers 72, for example.

Resilient members 74, such as coil springs for example, are used to return the shift collar 36 to the unlocked position when power is no longer being supplied to the coil 38. The resilient members 74 react between the coil housing 40 and drag plate 60. Optionally, a microswitch 76 and associated attachment nut 78 are also included in the differential locking mechanism 10 to monitor and inform the driver of the status of the differential 30.

Figure 8:
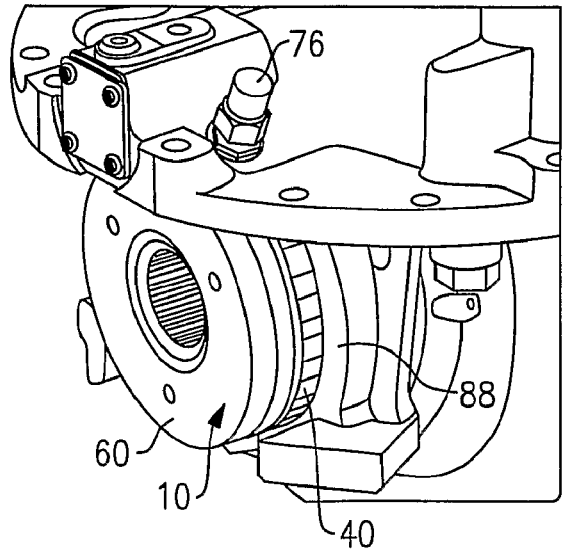
FIG. 8 is perspective view showing the actuating mechanism installed on an axle.

The coil housing 40 is shown in greater detail in FIG. 3. The coil housing 40 is comprised of a ring-shaped body having an inner circumferential surface 80 that surrounds an outer mounting surface 82 of the shift collar, and an outer circumferential surface 84 that includes attachment structure 86 for attachment to an axle component. In the example shown, the attachment structure 86 comprises a threaded attachment, and the axle component comprises a differential bearing cap 88 (FIG. 8) for a differential bearing 90. While a threaded attachment is shown, other attachment structures 86 could also be used, however, the benefit with using a threaded attachment is that a preload can be applied to the differential bearing 90 as needed by threading the differential locking mechanism onto the differential bearing cap 88. This will be discussed in greater detail below.

Figure 7:
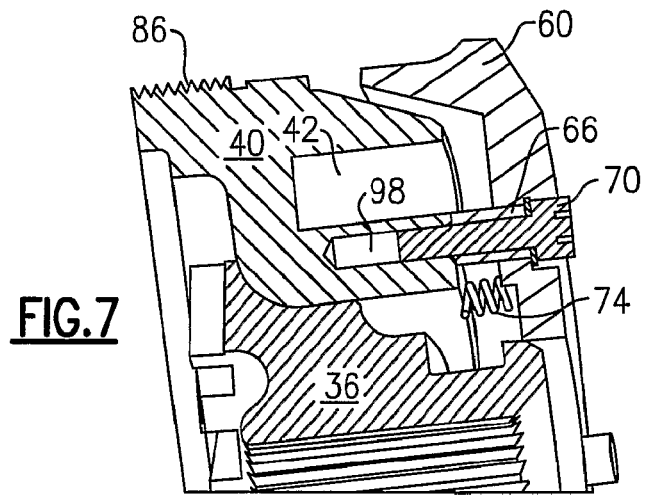
FIG. 7 is an enlarged cross-sectional view of an attachment interface between the drag plate and the coil housing.

The outer mounting surface 82 includes an increased diameter flange portion 92 that seats an end face portion 94 of the coil housing 40. An outermost end face 96 of the coil housing 40 abuts against the differential bearing 90. Opposite the outermost end face 96 is end face 68 of the coil housing 40. The recess 42 is formed within this end face 96. Further, the slide members 66 are mounted to this end face 68 with screws 70 (see FIG. 7). Bores 98 are formed within the body of the coil housing 40 to receive the screws 70.

Figure 4:
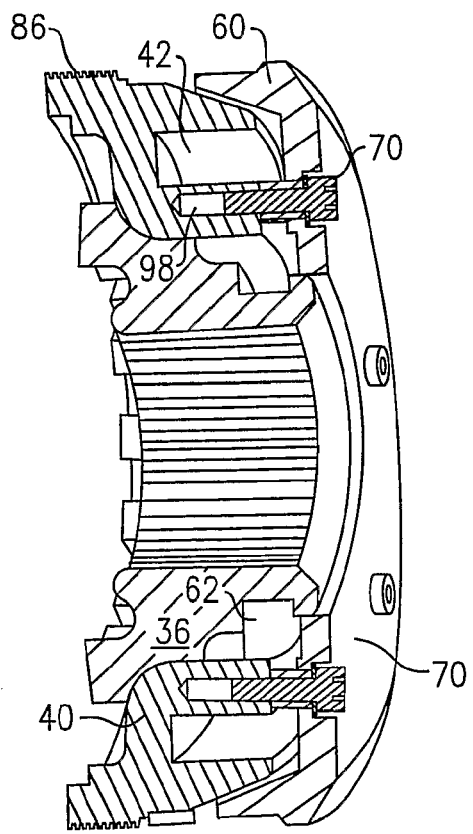
FIG. 4 is a partial cross-sectional view of a shift collar, coil housing, and drag plate.
Figure 5:
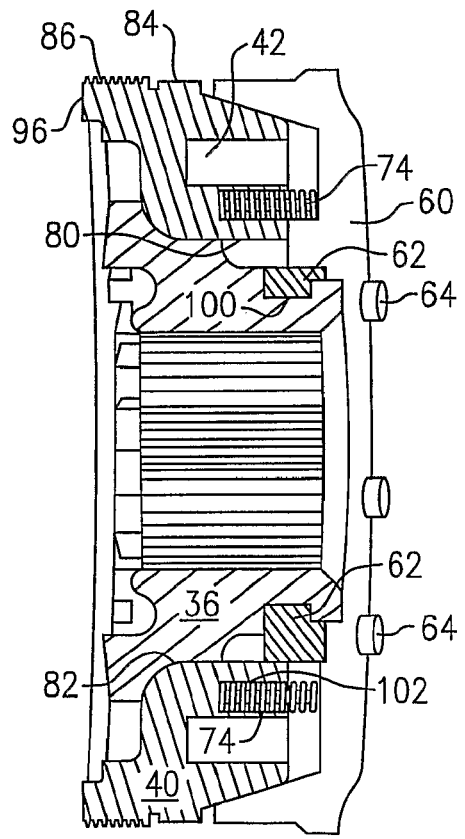
FIG. 5 is another cross-sectional view of the shift collar, coil housing, and drag plate.

As shown in FIGS. 4-5, the shift collar 36 includes a groove 100 formed about an outer circumferential surface at one end of the shift collar 36. Each drag anchor 62 is at least partially received within the groove 100. The fasteners 64 are inserted through openings in the drag plate 60 and are received within the drag anchors 62. As the fasteners 64 are tightened, the drag plate 60 slides on the slide members 66 towards the coil housing 40.

Figure 6:
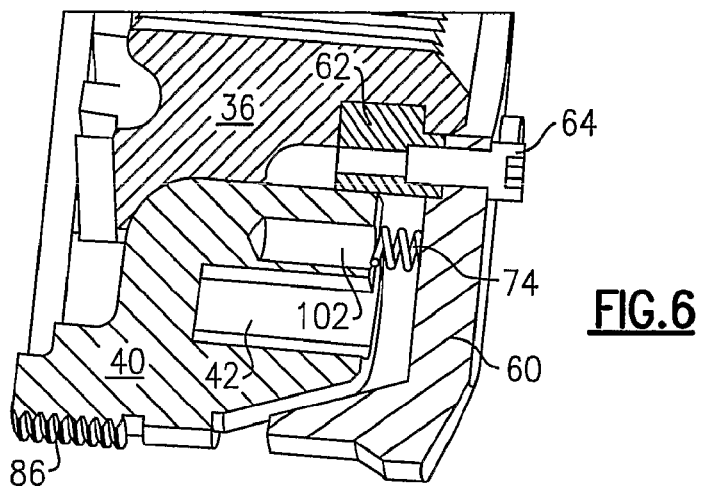
FIG. 6 is an enlarged cross-sectional view of an attachment interface between the drag plate and the shift collar.

The coil housing 40 also includes at least one bore 102 for receiving at least one resilient member 74, see FIGS. 5-6. Preferably, a plurality of resilient members 74 are utilized, with one resilient member 74 being received within each bore 102. The resilient members 74 are biased to return the shift collar 36 to an unlocked, i.e. disengaged position, when the coil 38 is not being supplied with power. The bores 102 are formed within the coil housing 40 between the inner circumferential surface 80 and the recess 42.

The differential locking mechanism 10 is assembled into the differential 30 in the following manner. The shift collar 36, coil housing 40, coil 38, resilient member 74, and drag plate 60 are assembled together to form a pre-assembled unit. The pre-assembled unit is attached to the differential bearing cap 88 in a manner similar to that of an adjusting nut. One of the benefits of this configuration is that the differential locking mechanism 10 is easily and quickly installed by a simple attachment method. Further, bearing preloads can be applied as needed, due to the threaded attachment interface between the coil housing 40 and differential bearing cap 88.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A differential locking mechanism for a drive axle comprising:
 a shift collar movable between an unlocked position where speed differentiation between a pair of axle shafts is permitted and a locked position wherein said shift collar engages a differential case to lock the pair of axle shafts for rotation together; and
 an electronic actuator for generating an electronic signal to move said shift collar from said unlocked position to said locked position, said electronic actuator including a coil housing supported by said shift collar and a coil mounted within said coil housing.

2. The differential locking mechanism according to claim 1 wherein said coil housing includes an inner circumferential surface that engages said shift collar and an outer circumferential surface including attachment structure for attaching the coil housing to an axle structure.

3. The differential locking mechanism according to claim 2 including a recess formed within said coil housing between said inner and said outer circumferential surfaces, said coil being received within said recess.

4. The differential locking mechanism according to claim 2 wherein the axle structure comprises a differential bearing cap.

5. The differential locking mechanism according to claim 4 wherein said attachment structure comprises a threaded attachment formed around one end of said coil housing.

6. The differential locking mechanism according to claim 2 wherein said coil housing includes at least one return recess that receives a resilient member to return said shift collar to said unlocked position when said coil is not powered.

7. The differential locking mechanism according to claim 6 including a coil recess formed within said coil housing between said inner and said outer circumferential surfaces, said coil being received within said coil recess, and wherein said at least one return recess comprises a plurality of return recesses that are formed within said coil housing between said coil recess and said inner circumferential surface and that are circumferentially spaced apart from each other about an axis defined by a center of said shift collar.

8. The differential locking mechanism according to claim 1 including a drag plate, at least one drag anchor supported by said coil housing, and at least one fastener for securing said drag plate to said at least one drag anchor.

9. The differential locking mechanism according to claim 8 wherein said shift collar includes a groove formed about an outer circumference at one end of said shift collar, said at least one drag anchor being received within said groove.

10. The differential locking mechanism according to claim 8 including at least one slide guide fixed to an end face of said coil housing, said drag plate being directly supported on said at least one slide guide for sliding movement relative to said coil housing.

11. The differential locking mechanism according to claim 10 wherein said at least one slide guide comprises a cylinder.

12. The differential locking mechanism according to claim 1 wherein said coil housing includes an attachment structure that is secured to a differential bearing cap.

13. The differential locking mechanism according to claim 12 wherein during attachment of said coil housing to the differential bearing cap a preload force is exerted against a differential bearing.

14. The differential locking mechanism according to claim 13 wherein said attachment structure comprises a threaded attachment.

15. The differential locking mechanism according to claim 1 wherein said coil housing includes an attachment structure for attachment to an axle component and said coil housing includes a distal end face at one housing end, and wherein said distal end face directly abuts against a differential bearing end face to set a bearing preload when said coil housing is attached to said axle component via said attachment interface.

16. The differential locking mechanism according to claim 15 wherein said attachment structure comprises a threaded attachment formed about an outer circumferential surface of said coil housing.

17. A differential locking mechanism for a drive axle comprising:
 a shift collar movable between an unlocked position where speed differentiation between a pair of axle shafts is permitted and a locked position wherein said shift collar engages a differential case to lock the pair of axle shafts for rotation together;
 an electronic actuator for generating an electronic signal to move said shift collar from said unlocked position to said locked position, said electronic actuator including a coil housing supported by said shift collar and a coil mounted within a recess formed within said coil housing;
 a resilient return mechanism that returns said shift collar to said unlocked position when said coil is not powered; and
 a drag plate covering an end face of said coil housing to enclose said coil within said recess.

18. The differential locking mechanism according to claim 17 wherein said coil housing comprises a ring-shaped body having an inner circumferential surface that engages an outer surface of said shift collar, and an outer circumferential surface that is secured to an axle structure, and with said recess comprising a groove formed in an end face of said coil housing and positioned between said inner and said outer circumferential surfaces.

19. The differential locking mechanism according to claim 18 wherein the axle structure comprises a differential bearing cap and wherein said outer circumferential surface includes a threaded attachment that is secured to the differential bearing cap to apply a preload to an associated differential bearing.

20. The differential locking mechanism according to claim 17 wherein said coil housing includes an inner circumferential surface that directly engages an outer surface of said shift collar and an outer circumferential surface that includes an attachment structure for attaching said coil housing to a differential bearing cap.

21. The differential locking mechanism according to claim 20 wherein said coil housing includes a distal end face at one housing end, and wherein said distal end face directly abuts against a differential bearing end face to set a bearing preload when said coil housing is attached to said differential bearing cap via said attachment structure.

22. The differential locking mechanism according to claim 20 wherein said attachment structure comprises a threaded attachment formed about said outer circumferential surface of said coil housing.

23. A method for assembling a differential locking mechanism into a drive axle comprising the steps of:
 (a) providing a shift collar movable between an unlocked position where speed differentiation between a pair of axle shafts is permitted and a locked position wherein the shift collar engages a differential case to lock the pair of axle shafts for rotation together; an electronic actuator for generating an electronic signal to move the shift collar from the unlocked position to the locked position, the electronic actuator including a coil housing supported by the shift collar and a coil mounted within a recess formed within the coil housing; a resilient return mechanism that returns the shift collar to the unlocked position when the coil is not powered; and a drag plate covering an end face of the coil housing to enclose the coil within the recess;

(b) assembling the shift collar, coil housing, coil, resilient return mechanism, and drag plate together as a pre-assembled unit; and (c) attaching the pre-assembled unit to an axle structure.

24. The method according to claim 23 wherein step (c) includes threading the coil housing to a differential bearing cap.

25. The method according to claim 23 wherein the coil housing includes an inner circumferential surface and an outer circumferential surface, and including the steps of engaging the inner circumferential surface of the coil housing against an outer surface of the shift collar during step (b).

26. The method according to claim 23 wherein the coil housing includes a distal end face at one housing end, and including the steps of abutting the distal end face directly against a differential bearing end face during step (c) to set a bearing preload.

* * * * *